United States Patent
Chernov et al.

(10) Patent No.: US 6,860,784 B2
(45) Date of Patent: Mar. 1, 2005

(54) IMAGE RETAINER

(76) Inventors: Yuri Chernov, 2448 E22nd St., Brooklyn, NY (US) 11235; Gennady Kleyman, 1290 E19th St., Brooklyn, NY (US) 11230; Leonid Kofman, 35 Sea Cost Ter., Brooklyn, NY (US) 11235

( * ) Notice: Subject to any disclaimer, the term of this patent is extended or adjusted under 35 U.S.C. 154(b) by 0 days.

(21) Appl. No.: 10/132,099

(22) Filed: Apr. 26, 2002

(65) Prior Publication Data

US 2003/0203348 A1 Oct. 30, 2003

(51) Int. Cl.⁷ .................................................. A63H 33/06
(52) U.S. Cl. ........................................ 446/118; 40/427
(58) Field of Search ................... 446/105, 107, 446/118, 124; 40/427, 579, 446; 33/514.2, 561.1; 434/407

(56) References Cited

U.S. PATENT DOCUMENTS

| | | | | |
|---|---|---|---|---|
| 1,989,680 A | * | 2/1935 | Carver et al. | |
| 2,523,647 A | * | 9/1950 | Burk | |
| 3,568,357 A | * | 3/1971 | Lebensfeld | |
| 4,536,980 A | * | 8/1985 | Fleming | 40/427 |
| 4,654,989 A | * | 4/1987 | Fleming | 40/427 |
| 5,555,163 A | * | 9/1996 | Pisani | 362/252 |
| 5,644,860 A | * | 7/1997 | Piper et al. | 40/579 |
| 6,189,246 B1 | * | 2/2001 | Gorthala | 40/446 |
| 6,298,587 B1 | * | 10/2001 | Vollom | 40/427 |

* cited by examiner

Primary Examiner—Derric Banks
Assistant Examiner—Jamila O Williams
(74) Attorney, Agent, or Firm—Dilworth & Barrese, LLP.

(57) ABSTRACT

A device for retaining a three-dimensional image includes a retainer capable of arresting displacement of pins in a position corresponding to a contour of a load applied to the pins.

4 Claims, 5 Drawing Sheets

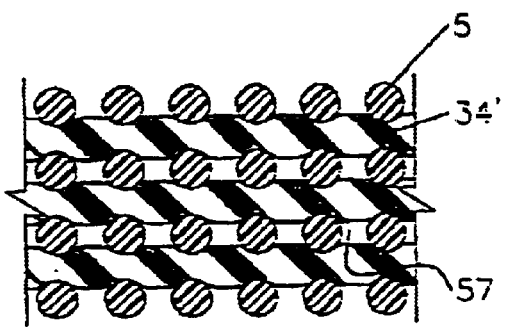
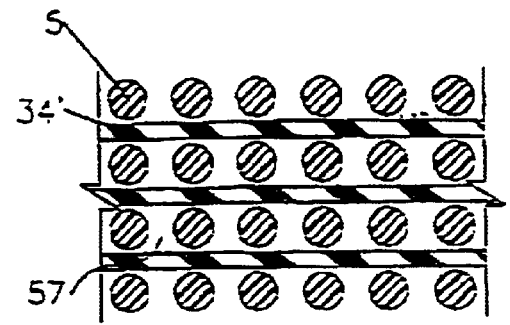
FIG.9    FIG.10
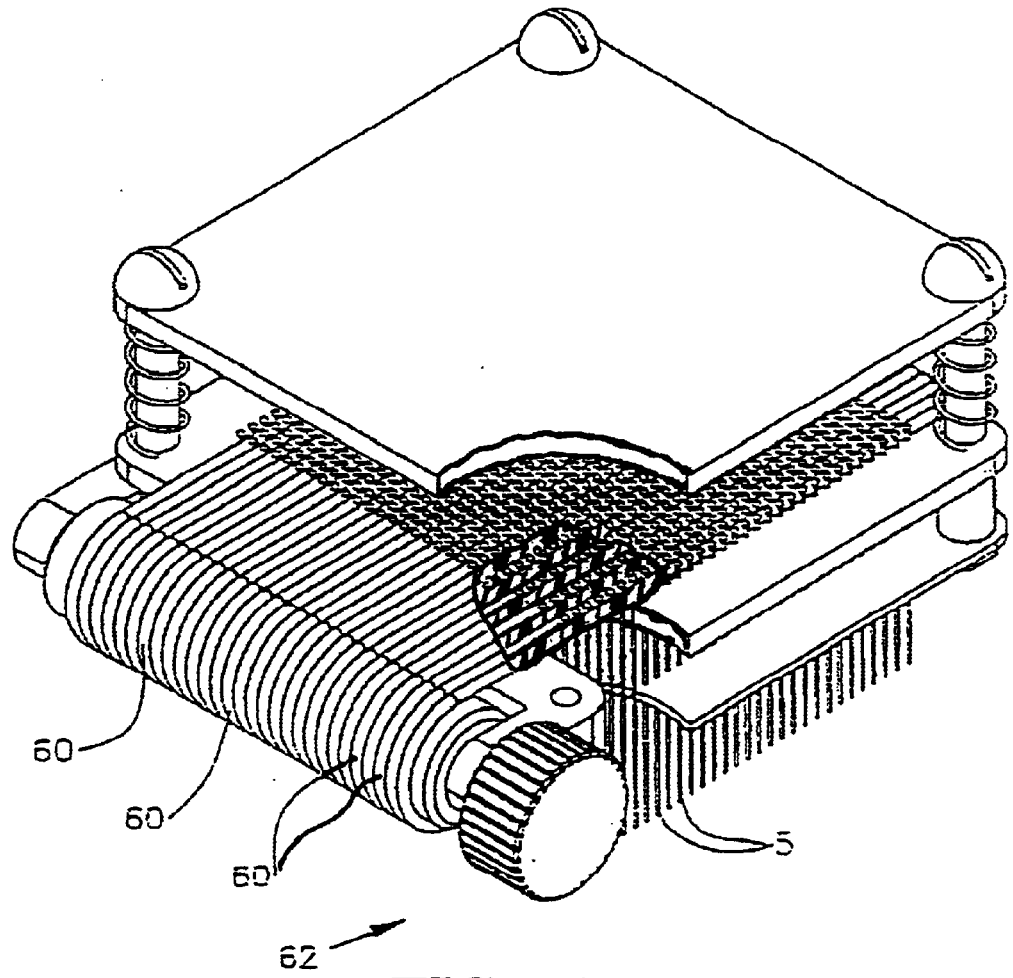
FIG.11

IMAGE RETAINER

FIELD OF THE INVENTION

This invention relates to a three-dimensional image retainer.

BACKGROUND OF THE INVENTION

It is known to utilize devices capable of forming a three-dimensional image of an object. Typically, these devices are provided with a support and a plurality of pins which can slide through numerous holes formed in the support in response to an external load. Depending on a shape of the load, the pins are displaceable at different distances to form a contour corresponding to a shape of the load. While a three-dimensional image is easily formed, it is difficult to preserve this image for a prolonged period of time. Particularly, displacing the support causes the pins to move from a position corresponding to the formed image.

It is therefore desirable to provide a three-dimensional image device which is capable of retaining a contour corresponding to the shape of a load even when the device is displaced.

SUMMARY OF THE INVENTION

In accordance with the invention, an image retainer has a support provided with an array of directional holes, a layer of material having a plurality of restricting holes, each of which is aligned with a respective directional hole. The restricting holes have a diameter smaller than a diameter of the directional holes and sized so that when an external load is removed, pins that have been displaced through aligned holes are held in fixed positions regardless of a position of the support.

In accordance with another aspect of the invention, a plate comprising a stretchable material, which is provided with a plurality of spaced strips, is placed upon a support so that each pair of neighboring strips flanks a respective row of spaced holes traversed by pins. The plate is mounted in such a manner that when no external force is applied to the plate, the adjacent strips squeeze the pins therebetween to maintain a formed contour of a load regardless of a position of the support. Once the external force is applied to the plate, the strips tend to stretch out and, consequently, narrow to free the pins that will move in a rest position.

In accordance with still another aspect of the invention, once an image is formed, the entire inventive device can be enclosed within a housing for preserving the image for a long time.

The above and other objects, features and advantages will become more readily apparent from a detailed description of the preferred embodiments accompanied by the following drawings, in which:

BRIEF DESCRIPTION OF THE DRAWINGS

FIG. 9 is a diagrammatic sectional view of the inventive device taken along lines D—D as shown in FIG. 7 and illustrating the inventive device in a rest position.

FIG. 10 is a diagrammatic sectional view of the inventive device taken along lines D—D as shown in FIG. 7 and illustrating the inventive device in a tensioned position.

FIG. 11 is an isometric view of the inventive device in accordance with still a further embodiment.

DETAILED DESCRIPTION OF EMBODIMENTS OF THE INVENTION

Figure 1:
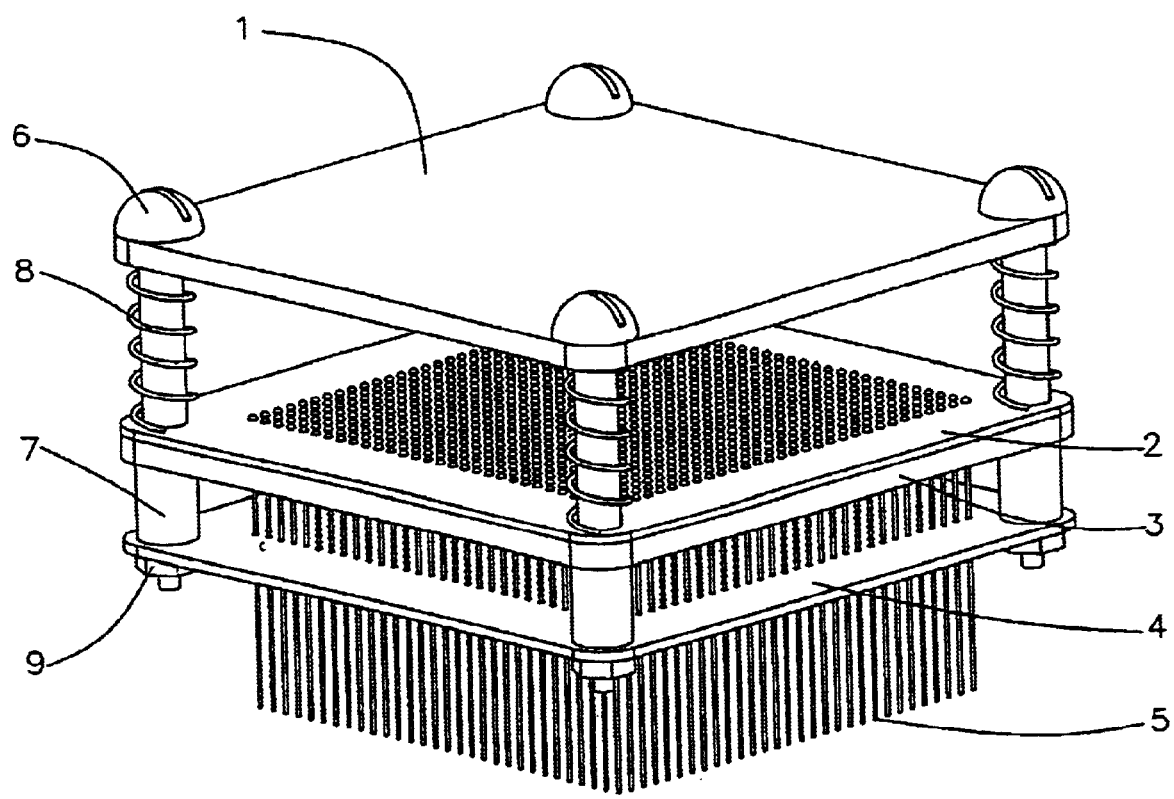
FIG. 1 is an isometric view of a first embodiment of an image retainer in accordance with the invention.

Referring to FIGS. 1–4, a plurality of fasteners 6 extend through a pair of supports 3 and 4 and attached to a plate 1. Each of the supports is provided with a respective array of directional holes positioned so that each of the holes of one of the supports is aligned with a respective hole of the other support. As a result, each pin 5 having an outer cross section somewhat smaller than an inner cross section of the directional holes traverses a respective pair of coaxial holes 3 of the supports 3,4. Accordingly, the pins can move relatively free through the holes when a load is applied to outer ends 5' to form a three-dimensional image or contour of the load.

To retain the contour, at least one of the supports 3 and 4 is covered by a layer of material, which has an array of restricting holes 2' (FIG. 4) provided with an inner cross section at most equal to the outer cross-section of the pins. Thus, the restricting holes are sized so that the pins can slide through the restricting holes in response to the load. Once the load is removed, the pins, which are frictionally engaged by the respective restricting holes, will be prevented from further displacement. Accordingly, regardless of any given position of the inventive device, the pins are retained in a displaced position corresponding to the contour of the load.

Figure 2:
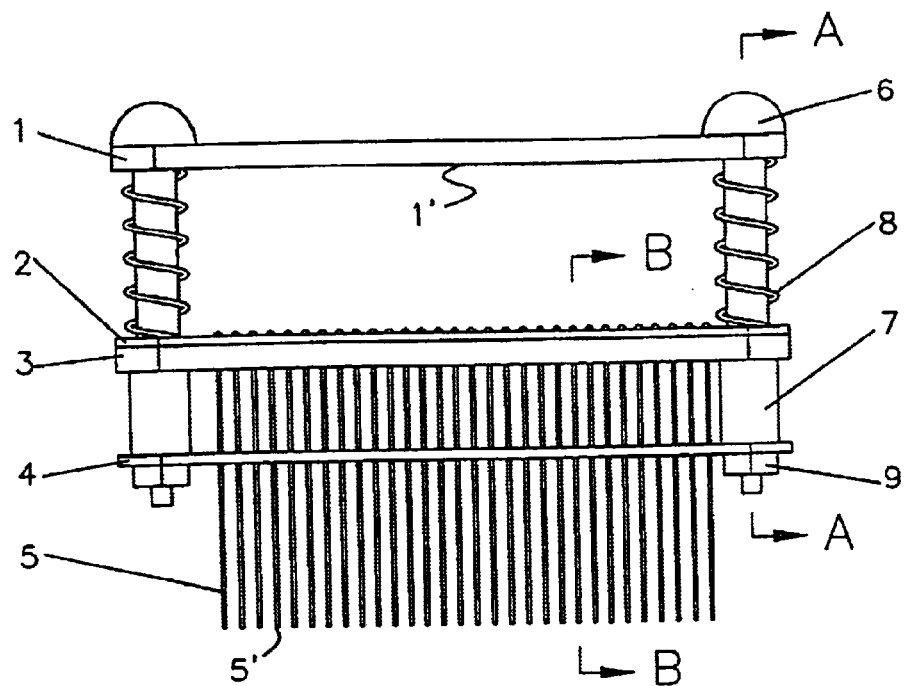
FIG. 2 is a front elevation view of the image retainer of FIG. 1.
Figure 3:
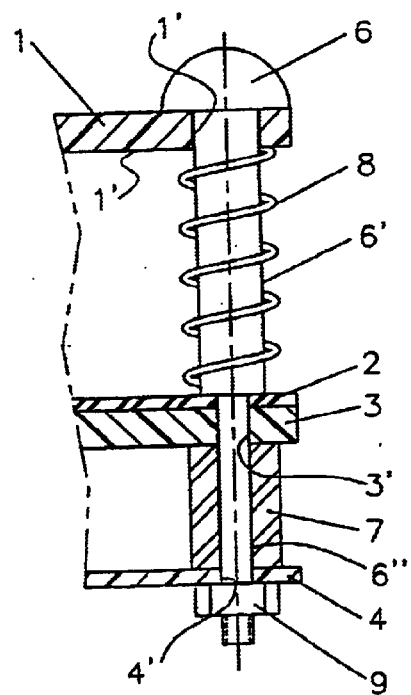
FIG. 3 is a sectional view of the image retainer shown in FIG. 2 and taken along lines A—A.
Figure 4:
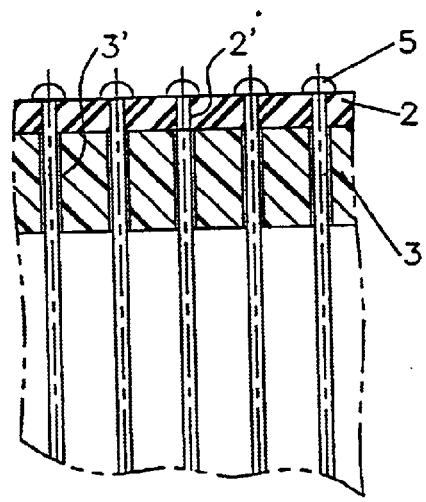
FIG. 4 is a sectional view of the image retainer shown in FIG. 2 and taken along lines B—B.

The layer 2 can be comprised of any stretchable material. However, it is preferred to have this material selected from fabric, plastic or rubber. The plate supports 3, 4 and the base 1 are preferably made of transparant material, such as plastic and can have a variety of shapes and dimension. The fasteners 6 can be selected from pins, bolts, screws and the like and used as guides positioning the base and the plate supports in a desirable spatial position relative to one another. As shown in FIG. 3, each of the fasteners has a fixing element 9, such as a nut, tightening on a threaded end of the fixing element and pressing against an outer side of the support plate 4 to establish the desirable position between the bottom and the supports. To displace the pins 5 from a retained position corresponding to the contour of the load to their rest or initial position, as shown in FIGS. 1 and 2, the supports 3, 4 and plate 1 can be displaced along the fasteners 6 relative to one another upon applying an external force. Such a force has to be sufficient to overcome a spring force of a spring 8 which extends between plate support 3 and plate 1 and biases the supports and plate in a spaced-apart position. As the plate 1 moves relative to the supports, an inner face 1' of the plate presses against the pins 5 and displaces them toward the intermediate support 3 until the plate 1 and the support 3 (or the layer 2) are located practically next to one another. To accomplish the displacement of the plate 1, the latter slides along a large-diameter portion 6' of the fastener 6 also having a small-diameter portion 6'. Alternatively, the fastener can have a uniform diameter and be provided with a sleeve acting as a portion 6'. Spacers 7 extending between the supports prevent relative displacement of these supports with respect to one another and maintain a parallel relationship therebetween. Upon removing the external force, the top 1 biased by the spring returns to its initial position shown in FIGS. 1–3.

Note that a number of fasteners, a shape and material of pins 5 as well as a shape of openings are arbitrary and can vary. Furthermore, the layer of material 2 can be placed on either of the support plates 3 or 4 with obvious modification of the illustrated structure.

Figure 5:
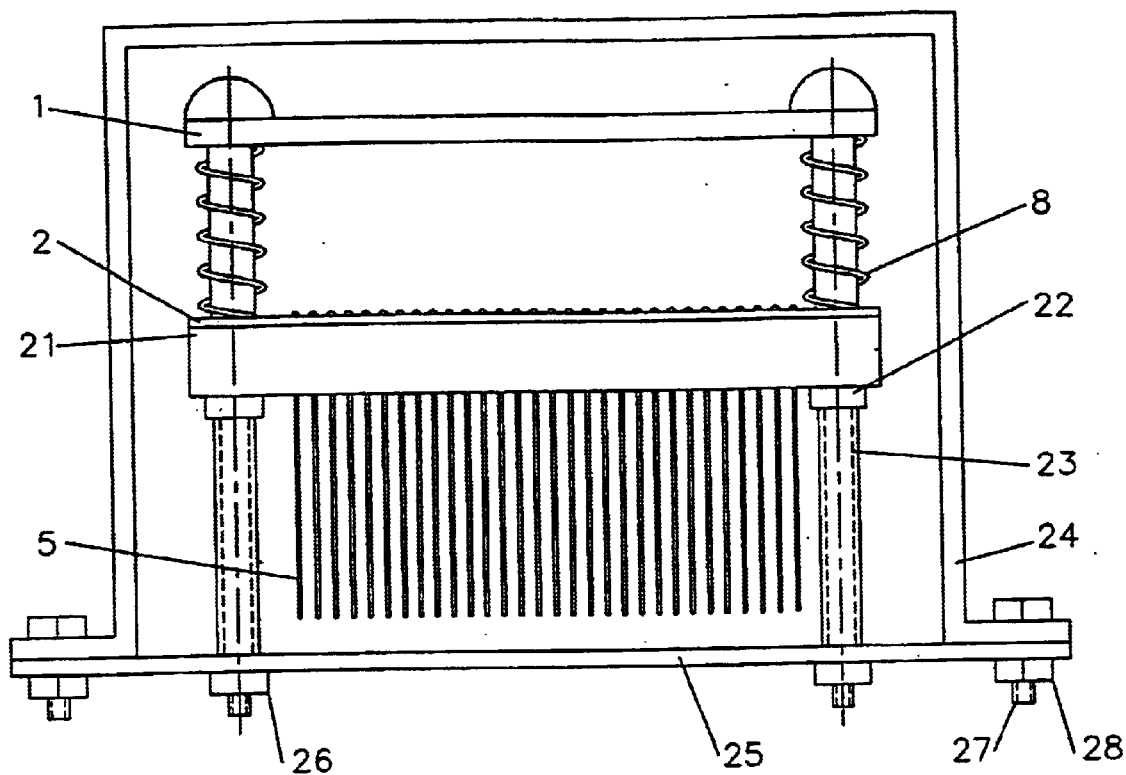
FIG. 5 is a front elevation view of the inventive device in accordance with another embodiment of the invention.
Figure 6:
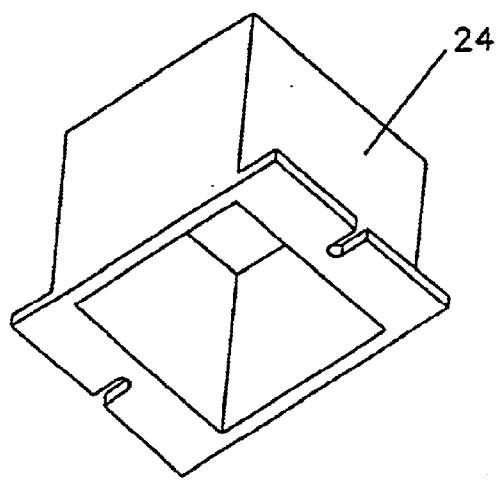
FIG. 6 is an isometric view of a cover for the embodiment shown in FIG. 5.
Figure 7:
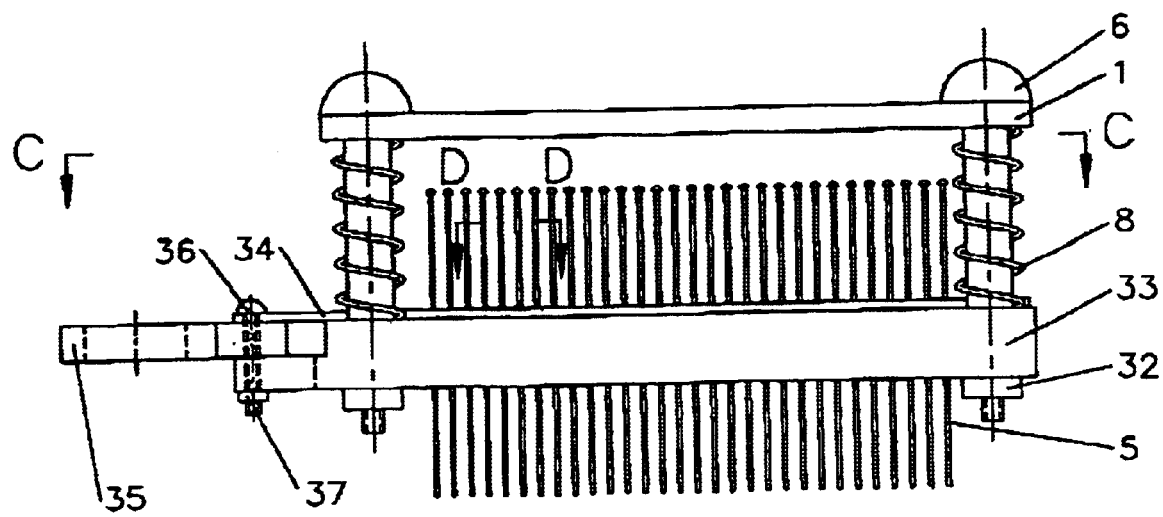
FIG. 7 is a front elevation view of still another embodiment of the inventive image retainer.
Figure 8:
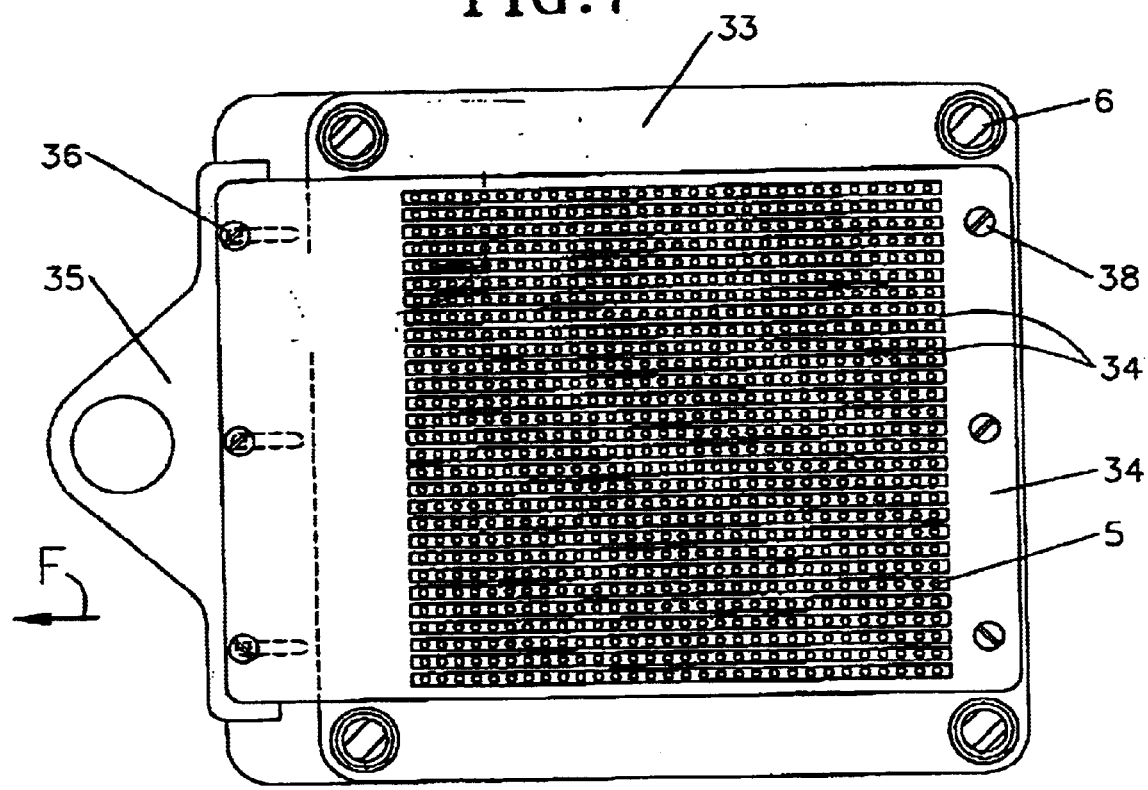
FIG. 8 is a sectional view of the inventive device shown in FIG. 7 and taken along lines C—C.

Referring to FIGS. 5 and 6, another embodiment of the inventive device is shown which is particularly applicable for preserving a three-dimensional image for a long time. Thus, this embodiment can be used to create an image that may have a particular sentimental value, such as a foot or hand imprint of a newborn baby. Critically, the device of FIG. 5 is provided with a housing comprised of transparent material, such as plastic, and having a bottom 25 removably attached to a cover 24 by means of fasteners 27–28. Similarly to the image retainer illustrated in FIGS. 1–4, this device has the plate 1 displaceable relative to the support 21 to move the pins 5 in their rest position and the layer of material 2 attached to the support 21. In contrast to the embodiment shown in FIGS. 1–4, the image retainer illustrated in FIG. 5 has only one support 21. Nuts 22 and 26 secure a position of the support 21 relative to the bottom 25 and to the housing.

To create an image by utilizing the inventive device shown in FIGS. 5 and 6, the cover is first removed, a load is impressed upon the pins 5, which are frictionally engaged by the layer 2, as explained above, and further, the cover is attached to the device.

Still, another embodiment of the inventive device is illustrated in FIGS. 7–10. Similarly to the above-discussed structures, this embodiment includes the support plate 33 which may or may not be movable at all. As is disclosed in previous embodiments, the support plate 33 is covered by a mat 34 having a side which is fixed to the plate 33 by fasteners 38. The opposite side of the mat 34 is fixed to a bracket 35 by means of fasteners 36 so that when the bracket is pulled out, the mat moves along with the bracket. The mat 34 has a central part formed with a plurality of elongated grooves 57 spaced apart in a direction perpendicular to an arrow F and flanked by strips 34' (FIG. 9) and aligned with rows of holes provided in the support. A distance between the strips in a normal position, when no tension is applied to the bracket 35, is such that pins 5 extending through the holes in the suppports are engaged between the adjacent strips. Since the mat 34 is comprised of stretchable material, when an external force is applied to the bracket 35, the latter is moved relative to the plate 33, as shown in FIG. 10, and because of the inherent elasticity of the mat 34, the strips 34' are narrowed and a distance therebetween is increased which allows the pins to drop freely to their rest position. Thus, to form a three-dimensional image, a user displces the bracket 35 and applies an external load to the outer ends of the pins 5 which are displaced to form a contour of the load, and, once the contour is formed and the external force is ceased, the mat accepts the position shown in FIG. 9. Accordingly, in this embodiment, it is not necessary to have the plate 1 and an arrangement of restricting openings, although a combination of the displaceable plate 1 and the stretchable mat 34 is possible.

To retain the contour, at least one of the supports 3 and 4 is covered by a layer of material, which has an array of restricting holes 2' (FIG. 4) provided with an inner cross section at most equal to the outer cross-section of the pins. Thus, the restricting holes are sized so that the pins can slide through the restricting holes in response to the load. Once the load is removed, the pins, which are frictionally engaged by the respective restricting holes, will be prevented from further displacement. Accordingly, regardless of any given position of the inventive device, the pins are retained in a displaced position corresponding to the contour of the load.

The layer 2 can be comprised of any stretchable material. However, it is preferred to have this material selected from fabric, plastic or rubber. The plate supports 3, 4 and the base 1 are preferably made of plastic and can have a variety of shapes and dimension. The fasteners 6 can be selected from pins, bolts, screws and the like and used as guides positioning the base and the plate supports in a desirable spatial position relative to one another. As shown in FIG. 3, each of the fasteners has a fixing element 9, such as a nut, tightening on a threaded end of the fixing element and pressing against an outer side of the support plate 4 to establish the desirable position between the bottom and the supports. To displace the pins 5 from a retained position corresponding to the contour of the load to their rest or initial position, as shown in FIGS. 1 and 2, the supports 3, 4 and plate 1 can be displaced along the fasteners 6 relative to one another upon applying an external force. Such a force has to be sufficient to overcome a spring force of a spring 8 which extends between plate support 3 and plate 1 and biases the supports and plate in a spaced-apart position. As the plate 1 moves relative to the supports, an inner face 1' of the plate presses against the pins 5 and displaces them toward the intermediate support 3 until the plate 1 and the support 3 (or the layer 2) are located practically next to one another. To accomplish the displacement of the plate 1, the latter slides along a large-diameter portion 6' of the fastener 6 also having a small-diameter portion 6". Alternatively, the fastener can have a uniform diameter through holes in the supports are engaged between the adjacent strips. Since the mat 34 is comprised of stretchable material, when an external force is applied to the bracket 35, when the bracket is biased, as shown in FIG. 10, because of inherent elasticity of the mat 34, the strips are narrowed and a distance therebetween is increased which allows the pins to drop freely to their rest position. Thus, to form a three-dimensional image, a user displaces the bracket 35 and applies an external load to the outer ends of the pins 5 which are displaced to form a contour of the load, and, once the contour is formed and the external force is ceased, the mat accepts the position shown in FIG. 9. Accordingly, in this embodiment, it is not necessary to have the plate 1 and an arrangement of restricting openings, although a combination of the displaceable plate 1 and the stretchable mat 34 is possible.

Instead of the mat provided with elongated grooves, it possible to have a plurality of separate elastic strips 60 extending between rows of pins 5, as shown in FIG. 11. To form an image, a user first applies a force directed to stretch out the separate strips, so that the pins can freely accept a three-dimensional image of a load. Once the image is formed, a drum mechanism 62 attached to one ends of the strips rotates to reduce the tension upon the strips, which, in turn causes the strips to expand laterally and engage the pins, thereby retaining the image.

While the invention has been disclosed with respect to preferred embodiments, various changes can be made without departing from the scope of the invention as defined by the appending claims.

We claim:

1. An image retainer comprising:

a support having a multiplicity of apertures arranged in parallel rows;

a plurality of pins displaceable through the apertures in response to applying a load, which has a contour, to one end of the pins so that the pins move toward an impressed position, in which opposite ends of selectively impressed pins recreate the contour corresponding to an image of the object; and a mat having opposite sides, one of the opposite sides being fixed to the support, the mat being made of stretcable material and provided with an inner part having a plurality of elongaged grooves, each groove being defined between a pair of longitudinal flanks and traversed by a respective row of the plurality of pins; and a bracket attached to an opposite side of the mat and displaceable therewith relative to the support in response to applying an external force so that when no external force is applied in the impressed position, the pairs of longitudinal flanks engage pins therebetween so as to prevent displacemet of the pins regardless of orientation of the support, and when the external force is applied, the pair of longitudinal flanks disengage the pins.

2. The image retainer defined in claim 1, wherein the elongated grooves each have a plurality of openings, each of the openings being traversed by a respective pin and having a respective inner diameter, which is at most equal to an outer diameter of the pins.

3. The image retainer defined in claim 1, further comprising a housing enclosing the support and the retainer and having a top made from transparent material and juxtaposed with the inner ends of the plurality of pins.

4. The image retainer defined in claim 1, wherein the support is comprised of transparent material.

* * * * *